United States Patent [19]

Tipper

[11] 4,373,806

[45] Feb. 15, 1983

[54] DYNAMIC TIMING OF ROTATING OR RECIPROCATING MACHINE PARTS

[75] Inventor: Derrick W. Tipper, Sandiacre, England

[73] Assignee: Imperial Group Limited, England

[21] Appl. No.: 181,405

[22] Filed: Aug. 26, 1980

[30] Foreign Application Priority Data

Sep. 12, 1979 [GB] United Kingdom ................. 7931700

[51] Int. Cl.[3] ............................................ G01P 3/40

[52] U.S. Cl. ................................................. 356/23

[58] Field of Search ............... 356/23; 324/75; 73/466

[56] References Cited

U.S. PATENT DOCUMENTS 4,180,329 12/1979 Hildebrand ........................ 356/23 X

*Primary Examiner*—F. L. Evans

*Attorney, Agent, or Firm*—Larson and Taylor

[57] ABSTRACT

The position of a reciprocating or rotating part of a machine is identified at a required point in the machine cycle by dividing the machine cycle into numbered notional segments and viewing the part by a stroboscope flash at a preselected numbered segment. The preselected numbered segment is identified by counting the segments through the machine cycle and comparing the count with a present count number on another counter.

5 Claims, 4 Drawing Figures

Figure 1:
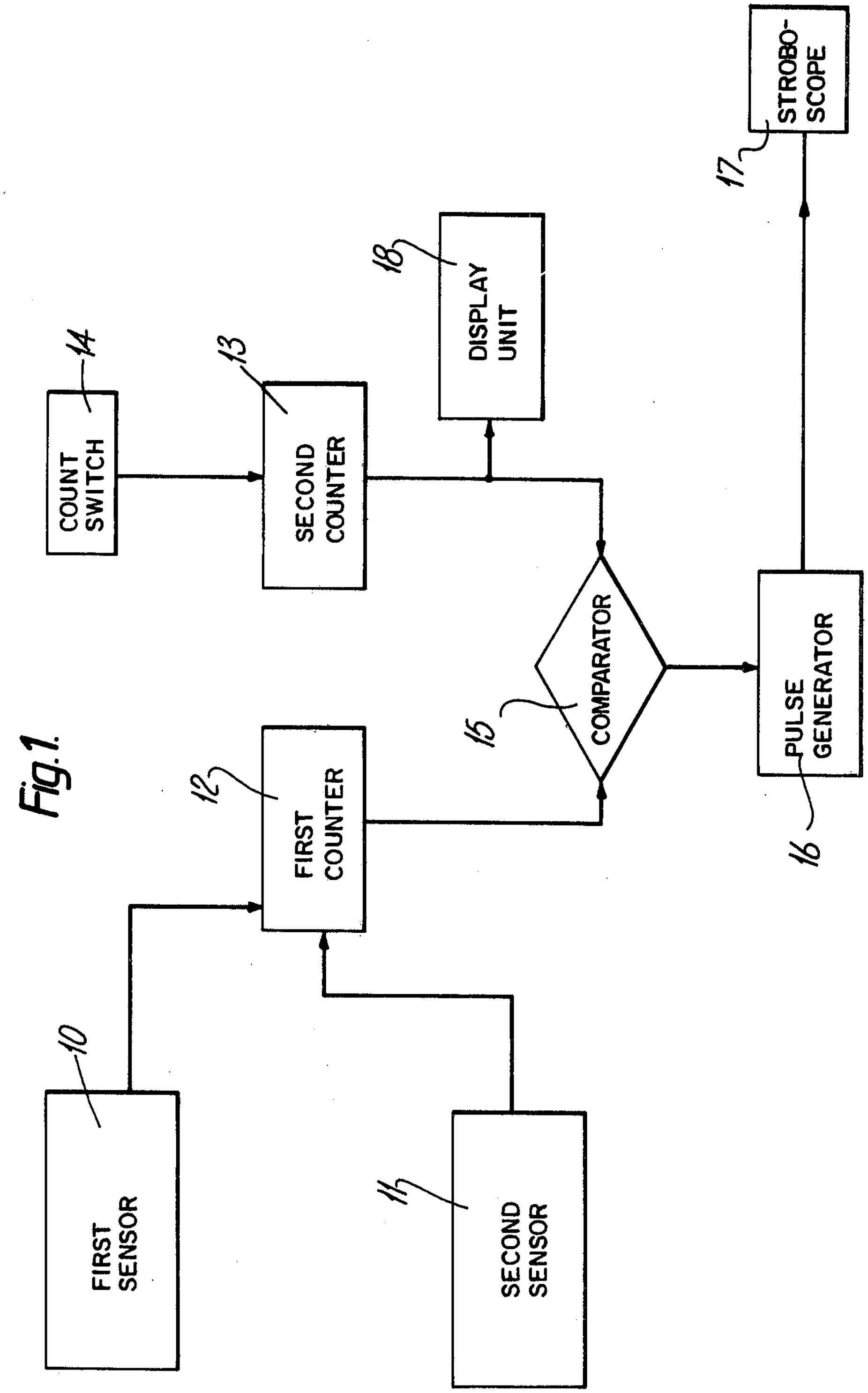

FIRST SENSOR
10
SECOND SENSOR
11
FIRST COUNTER
12
COUNT SWITCH
14
SECOND COUNTER
13
COMPARATOR
15
DISPLAY UNIT
18
PULSE GENERATOR
16
STROBO-SCOPE
17

DYNAMIC TIMING OF ROTATING OR RECIPROCATING MACHINE PARTS

TECHNICAL FIELD

The invention relates to the use of a stroboscope to observe machine parts or other objects periodically moving (i.e. including rotation and reciprocation) at high speeds. If a rapidly rotating machine part is viewed by a brief flash of light from a stroboscope once every rotation at the same point of the rotation, the part will appear to be stationary, enabling its behaviour at high speed at that point to be studied.

BACKGROUND ART

In many machines carrying out a sequence of operations involving rapidly rotating and/or reciprocating parts it is essential for effective functioning of the machine that the parts be in the correct positions with reference to each other at certain defined points in the machine cycle. The procedure of moving the machine parts to their correct positions is known as "setting the timing". This is usually done by accurately positioning by hand a reference mark on one part of the machine against a reference mark on another part whilst the machine is effectively stationary. This is an expensive time-consuming operation and has to be repeated from the beginning if it is suspected that the timing of the machine has altered. Further, if a machine is stationary while its timing is being set, the effects of back-lash and wear in components may well alter the effective timing when the machine is running under load.

It is an object of the present invention to provide a means by which the timing of a rotating or reciprocating machine part may be investigated easily without the effects of back-lash or wear throwing doubt on the result of the investigation.

INVENTION

According to a first aspect of the invention there is provided in a cyclically operating machine having a periodically moving part a method of identifying at a preselected point in the machine cycle the instantaneous position of that part comprising, (a) detecting the start of each operating cycle of the machine, (b) counting segments of the operating cycle and allocating a count number to each segment, the counting being reset at the start of each cycle, (c) selecting and locating a segment of the operating cycle corresponding to the preselected point, (d) delivering to a stroboscope an actuating signal indicative of the selecting and locating of said segment, (e) illuminating the machine part by means of the stroboscope during said segment of the operating cycle, and (f) displaying the count number generated by the first counter, corresponding to said segment.

The selecting and locating of the required segment of the operating cycle may be carried out by presetting a variable delay counter to the count number of said segment, comparing during an operating cycle of the machine the count of the segments with the preset count of the variable delay counter, and, when the two counts are coincident, generating said actuating signal.

According to a second aspect of the invention there is provided for use in a cyclically operating machine having a periodically moving part, apparatus for identifying at a preselected point in the machine cycle the instantaneous position of that part comprising, (a) sensor means for detecting the start of each operating cycle of the machine (b) a first counter for counting segments of the operating cycle and allocating a count number to each segment, including means to reset the counting at the start of each cycle (c) means for selecting and locating a segment of the operating cycle corresponding to the preselected point (d) a stroboscope (e) means for delivering to the stroboscope an actuating signal indicative of the sealing and locating of said segment, and (f) means for displaying the count number corresponding to said segment.

The advantages offered by the invention include, (a) the method is independent of machine speed and absolute time;

(b) back-lash and wear do not confuse the timing setting because the position of the machine part is observed when the machine is in its normal running mode;

(c) the displayed count number is characteristic of the observed position of the machine part and can be interpreted to quantify by how much and in which direction a machine part should be adjusted to ensure correct timing.

Figure 2:
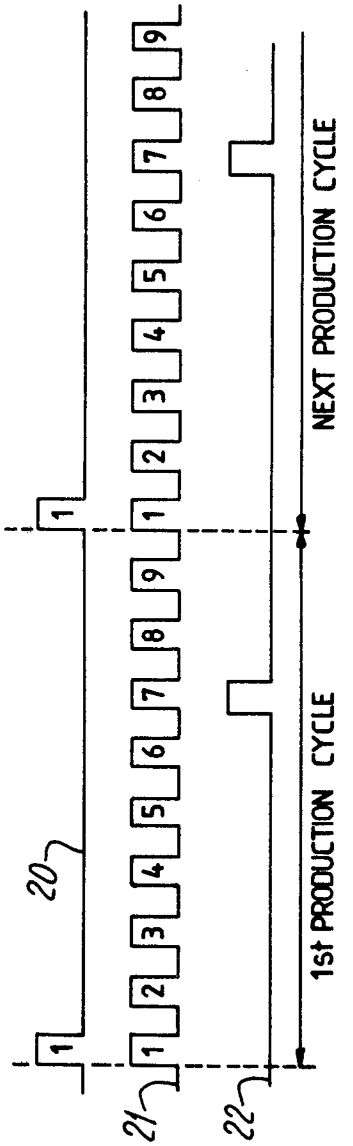
Figure 3:
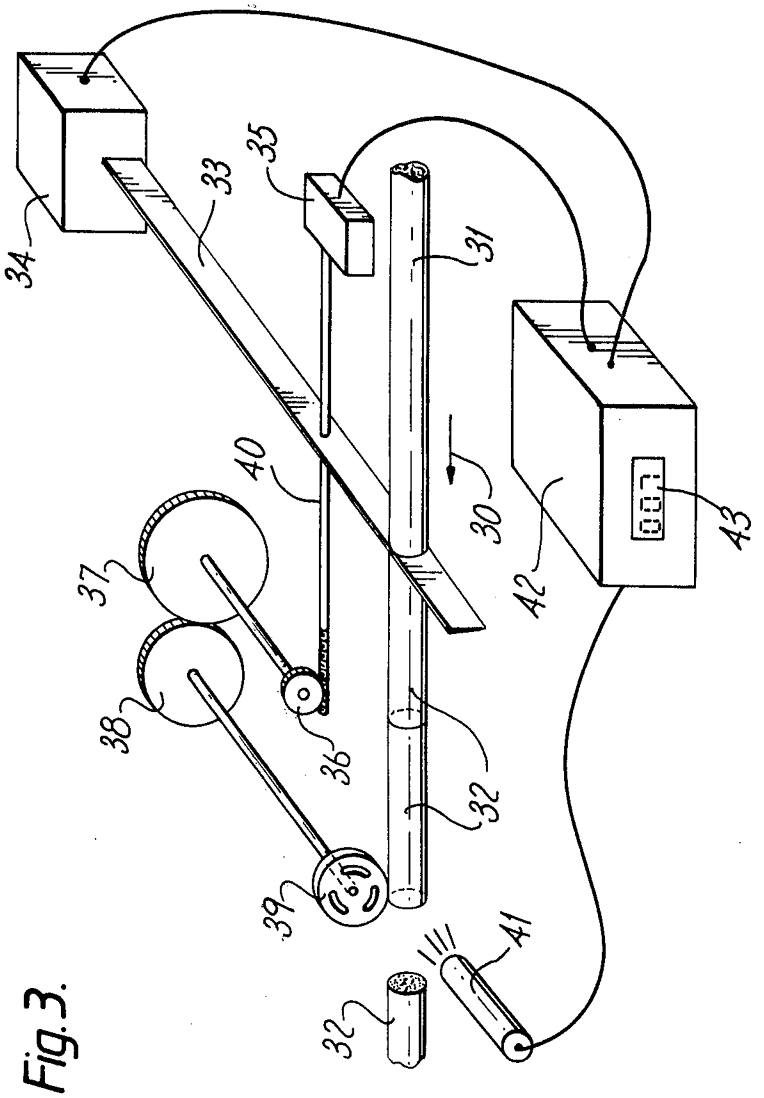
Figure 4:
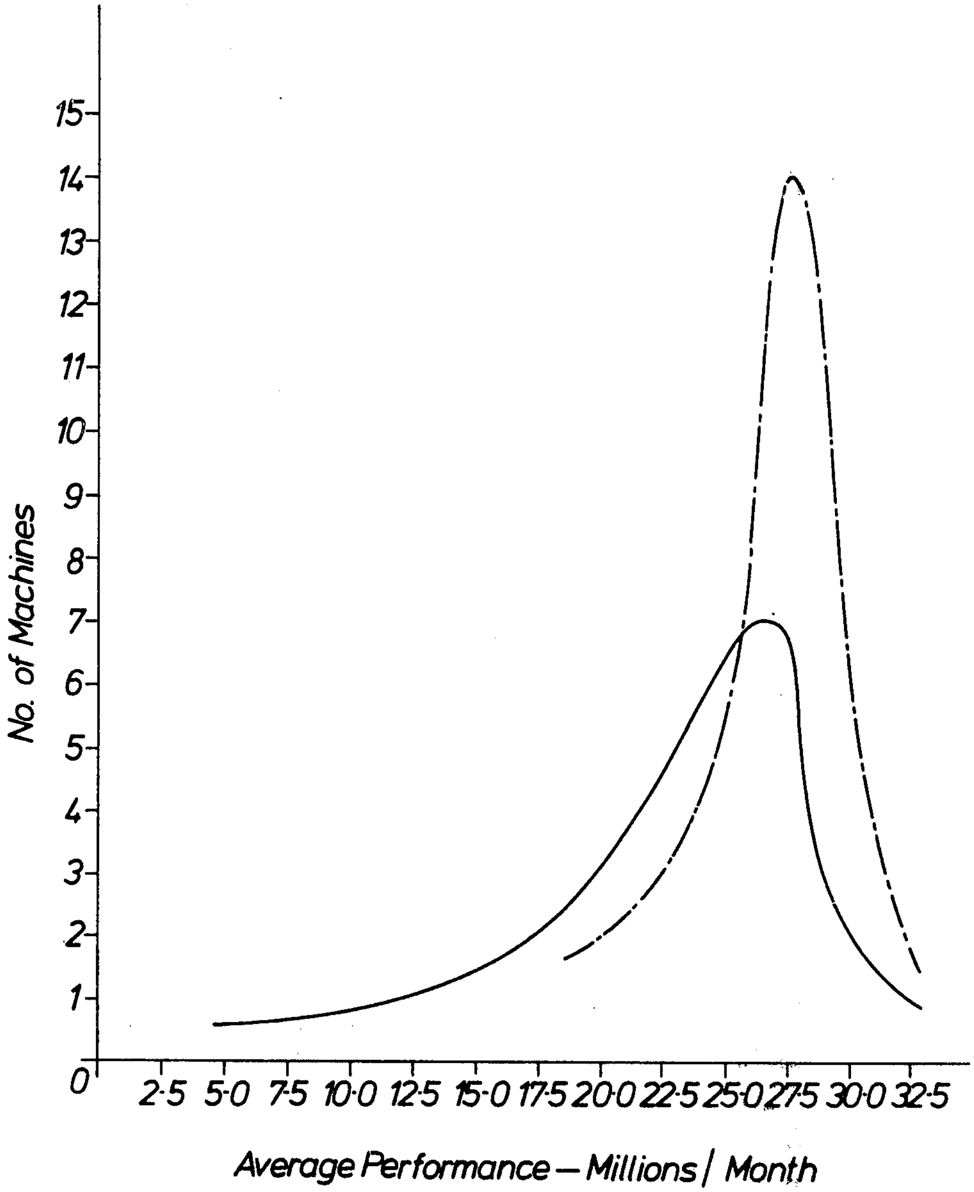

The invention will now be described by way of example only with reference to the accompanying drawings in which, FIG. 1 is a schematic flow diagram of the invention, FIG. 2 is a timing diagram, FIG. 3 is a diagrammatic perspective view of part of a cigarette making machine utilizing the invention, and FIG. 4 is a graph showing improved performance by a number of machine using the invention.

Referring to FIG. 1, a sensor 10 on a machine, for example a cigarette making machine, detects the start of the production or operating cycle, which for convenience is defined as the cutting of the cigarette rod into individual cigarettes. A second sensor 11 divides the production cycle into a number of equal notional segments. A first counter 12 is reset at the start of each production cycle by sensor 10 and, during each production cycle, counts off the successive segments of the machine cycle through signals fed to it by sensor 11, each segment thereby being allocated a count number by counter 12.

A second, variable delay, counter 13 is adjusted to a count number within the range of the number of segments of the production cycle by means of an increase/-decrease count switch 14. A digital read-out of counter 13 is shown on display unit 18.

As the count of the production cycle segments by counter 12 progresses so the readings of the two counters 12, 13 are compared by a comparator circuit 15. When the readings of the two counters are equal, that is, when the segment number reached by counter 12 is equal to the preset number present on the variable delay counter 13, a pulse generator 16 sends an actuating pulse to a stroboscope 17 which then lights momentarily.

If the stroboscope 17 is directed at a rotating part of the cigarette making machine, e.g. a rotating suction wheel, the actuation of the stroboscope when the counters are equal will "freeze" the rotating suction wheel at a segment of the production cycle defined by the number set on counter 13. The stroboscope 17 will illuminate the rotating wheel at exactly the same product cycle segment during every machine cycle thus making the rotating wheel appear to be stationary at that point in the cycle. A fiducial mark on the wheel can then be compared with a static timing mark on the machine casing.

By operating the increase/decrease count switch 14 the number displayed on unit 18 can be altered. The stroboscope will then light up at a different segment of the production cycle defined by the new number set on counter 13. The rotating wheel will then appear to have moved to a new position and its fiducial mark compared again with the static timing mark. By appropriate manipulation of switch 14 the apparently stationary wheel can be moved until its fiducial mark is aligned with the static timing mark. The digital reading of the count displayed on unit 18 is therefore characteristic of the position of the wheel at a defined segment of the production cycle and can be used to check subsequently whether the apparent position of the wheel has drifted from that position, perhaps because of wear or backlash.

It will be seen that the method is independent of machine speed and absolute time because the moving part is illuminated by the stroboscope once during each machine cycle.

Referring to the timing diagram of FIG. 2, line 20 shows the pulses generated by the start of production cycle sensor 10, and line 21 shows the pulses generated by the segment of production cycle sensor 11. For the sake of simplicity, the production cycle has been shown divided into 9 segments, although in practice the number of segments may be 10 or more times this number, depending on the complexity of the machine and its speed of operation. The number of segments chosen for the production cycle will depend on the circumstances peculiar to the machine. It is assumed for this example that counter 13 has been set to display number 7. Line 22 shows the firing pulse for the stroboscope. It will be seen that this pulse occurs when the number of segments counted by counter 12 is equal to that set on counter 13, i.e. "7".

Referring now to FIG. 3 there is shown a diagrammatic representation of part of a cigarette making machine in which continuous cigarette rod 31, proceeding in direction of arrow 30 produced by the machine is cut into individual cigarette portions 32 by knife 33 which is driven by knife drive shaft 40. Sensor 34 detects the cutting operation and produces the "start of production cycle" signal. Sensor 35, also connected to the knife drive shaft 40 produces the "segment of production cycle" signals. Rotating suction wheel 39, driven by gears 36, 37 and 38 from the knife drive shaft 40 is adjustable and is set to pick up cigarette 32, 3 mm along its length.

The machine contains two counters (not illustrated, but corresponding to counters 12 and 13 of FIG. 1). one of which is manually set, and the second of which is reset to zero at the start of the production cycle and counts the signals from sensor 35. The counters are compared by comparator 42 and on becoming equal a stroboscope 41 illuminates the suction wheel 39 and the cigarette portions 32. Comparator 42 displays (43) the number manually set on the above mentioned first of the two counters.

Because the stroboscope 41 is flashed in synchronism with the machine, the suction wheel 39 and the adjacent cigarette portions 32 appear to be stationary, and their relative positions may be observed. By adjusting the manual counter the machine part may be stepped through its production cycle until the cigarette rod 32 is observed to be positioned in the required location relative to the suction wheel 39, which then may be observed for correct position. The digital read-out 43 can then be noted and used for positioning the suction wheel 39 for future resetting. The machine may now be set, having established the correct readout, without the product in the machine.

Referring to FIG. 4 there is shown in graphical form the performances of 31 cigarette making machines, comparing the average monthly output or performance (in millions of cigarettes) of the machine before they were modified according to the invention (solid line graph) with the average monthly output of the same machines (chain line graph) after they were modified according to the invention of FIG. 3. FIG. 4 was derived from 13-week runs on each of the 31 machines both before and after modification by the invention. There runs are summarised in the following Table:

| Machine No. | 13 week average before modification (millions/month) | 13 week average after modification (millions/month) |
|---|---|---|
| 1 | 21.5 | 27.5 |
| 2 | 28.5 | 27.3 |
| 3 | 17.7 | 21.8 |
| 4 | 25.6 | 21.5 |
| 5 | 25.2 | 27.0 |
| 6 | 25.8 | 25.6 |
| 7 | 26.7 | 27.4 |
| 8 | 11.9 | 22.4 |
| 9 | 19.1 | 25.3 |
| 10 | 24.5 | 25.6 |
| 11 | 22.8 | 26.0 |
| 12 | 23.8 | 22.9 |
| 13 | 22.4 | 28.0 |
| 14 | 13.0 | 26.3 |
| 15 | 26.5 | 19.8 |
| 16 | 7.2 | 16.4 |
| 17 | 15.8 | 26.8 |
| 18 | 4.9 | 16.7 |
| 19 | 20.9 | 16.4 |
| 20 | 16.6 | 27.4 |
| 21 | 21.1 | 28.3 |
| 22 | 14.1 | 25.8 |
| 23 | 23.6 | 24.8 |
| 24 | 26.0 | 24.1 |
| 25 | 30.9 | 29.9 |
| 26 | 21.3 | 25.3 |
| 27 | 24.2 | 26.3 |
| 28 | 18.3 | 18.3 |
| 29 | 26.8 | 27.7 |
| 30 | 24.7 | 27.8 |
| 31 | 28.6 | 29.5 |
| Mean | 21.3 | 24.7 |
| Standard Deviation | 6.2 | 3.8 |

It will be seen from the Table and FIG. 4 that, by means of the invention, the mean performance of the machines has been improved by about 13% and the range of machine performance (as measured by standard deviation) has been markedly decreased.

It will be observed that the above demonstrated improvement in output resulted from the application of the invention to a small travel area of the machine between the knife and the suction wheel. It is to be expected that further overall improvements would result from application of the invention to the other problem areas of the machine.

When a machine is used to produce cigarettes of different lengths, only one reference mark is required on the machine, different delay counter settings can be obtained for each size.

Reference marks may be arbitrarily placed on the machine, removing the need for accurate positioning of timing marks.

The invention can be used to locate and help to eliminate unwanted movements of a product within a machine caused by misalignment of guide rails, etc. The invention allows a machine to be timed without the product (e.g. cigarettes) being fed into the machine. This reduces the waste (e.g. of tobacco) normally associated with the commissioning of machines.

The selecting and locating of the required segment of the operating cycle may be provided by means other than a present variable delay counter, such as switching associated with the counting of the segments of the operating cycle.

The invention may be applied to other machinery such as pneumatic tray fillers.

I claim:

1. In a cyclically operating machine having a periodically moving part, a method of identifying at a preselected point in the machine cycle the instantaneous position of that part, said method comprising:

(a) detecting the start of each operating cycle of the machine, (b) counting segments of the operating cycle and allocating a count number to each segment, the counting being reset at the start of each cycle, (c) selecting and locating a segment of the operating cycle corresponding to the preselected point by presetting a variable delay counter to the count number of said segment, comparing during an operating cycle of the machine the count of the segments with the preset count of the variable delay counter, and, when the two counts are coincident, generating an actuating signal, (d) delivering to a stroboscope the actuating signal indicative of the selecting and locating of said segment, (e) illuminating the machine part by means of the stroboscope during said segment of the operating cycle, and (f) displaying the count number corresponding to said segment.

2. For use in a cyclically operating machine having a periodically moving part, apparatus for identifying at a preselected point in the machine cycle the instantaneous position of that part, said apparatus comprising:

(a) sensor means for detecting the start of each operating cycle of the machine, (b) a first counter for counting segments of the operating cycle and allocating a count number to each segment, including means for resetting the counting at the start of each cycle, (c) means for selecting and locating a segment of the operating cycle corresponding to the preselected point, said selecting and locating means comprising a second, variable delay counter, comparator means for comparing the count of the first counter with the count of the second counter and means for generating said actuating signal when the two counts are coincident, (d) a stroboscope, (e) means for delivering to the stroboscope the actuating signal indicative of the locating of said segment, and (f) means for displaying the count number corresponding to said segment.

3. Apparatus as claimed in claim 2 wherein there is provided means for presetting the count nunmber of the second counter to a required value.

4. Apparatus as claimed in claim 3 wherein the means for presetting the count number of the second counter comprises an increase/decrease count switch.

5. Apparatus as claimed in claim 2 wherein the cyclically operating machine is a cigarette making machine.

* * * * *